US010819709B1

(12) United States Patent
M'Raihi et al.

(10) Patent No.: US 10,819,709 B1
(45) Date of Patent: Oct. 27, 2020

(54) AUTHORIZING DELEGATED CAPABILITIES TO APPLICATIONS IN A SECURE END-TO-END COMMUNICATIONS SYSTEM

(71) Applicant: Symphony Communication Services Holdings LLC, Palo Alto, CA (US)

(72) Inventors: David M'Raihi, San Carlos, CA (US); Aaron Scales, Palo Alto, CA (US); Bruce Skingle, Palo Alto, CA (US); Glenn Anderson, San Jose, CA (US); Benjamin Liu, Fremont, CA (US); Paul Teyssier, Palo Alto, CA (US); Daniel Nathanson, Millbrae, CA (US)

(73) Assignee: SYMPHONY COMMUNICATION SERVICES HOLDINGS LLC, Palo Alto, CA (US)

(*) Notice: Subject to any disclaimer, the term of this patent is extended or adjusted under 35 U.S.C. 154(b) by 249 days.

(21) Appl. No.: 15/714,734

(22) Filed: Sep. 25, 2017

Related U.S. Application Data

(60) Provisional application No. 62/399,987, filed on Sep. 26, 2016.

(51) Int. Cl.
*H04L 29/06* (2006.01)
*H04L 9/32* (2006.01)
*H04L 29/08* (2006.01)

(52) U.S. Cl.
CPC ......... *H04L 63/0884* (2013.01); *H04L 9/321* (2013.01); *H04L 9/3213* (2013.01); *H04L 63/0807* (2013.01); *H04L 67/141* (2013.01); *H04L 63/062* (2013.01); *H04L 63/126* (2013.01)

(58) Field of Classification Search
CPC ............ H04L 63/0884; H04L 63/0807; H04L 63/062; H04L 63/126; H04L 67/141; H04L 9/321; H04L 9/3213
See application file for complete search history.

(56) References Cited

U.S. PATENT DOCUMENTS 5,689,565 A * 11/1997 Spies .................... G06F 21/602
380/277
8,266,433 B1 9/2012 Przykucki et al.
9,591,479 B1 3/2017 Leavy et al.
(Continued)

*Primary Examiner* — Robert B Leung
(74) *Attorney, Agent, or Firm* — Goodwin Procter LLP

(57) ABSTRACT

An organization that wishes its messages to be secure (the "communicating organization") uses services of a secure communications infrastructure to securely exchange communications among its users. The secure communications infrastructure allows granting to third-party applications the permission to act on behalf of the users when using the secure communications infrastructure. This delegation may be accomplished at a very granular level, specifying the particular applications that are authorized to act on behalf of a user, the particular operations that those applications are authorized to perform, and/or in which contexts the applications may perform the operations. An agent component acts as an intermediary between third-party applications and the core of the secure communications infrastructure. This permits the third-party application to take actions on behalf of the user, while also preventing the third-party applications from obtaining the security-specific data that could lead to a breach of security.

20 Claims, 9 Drawing Sheets

(56) References Cited

U.S. PATENT DOCUMENTS

| | | | |
|---|---|---|---|
| 9,667,416 B1 | 5/2017 | Machani et al. | |
| 10,237,246 B1 | 3/2019 | Mulayin et al. | |
| 10,432,589 B1 | 10/2019 | M'Raihi et al. | |
| 2003/0236987 A1* | 12/2003 | Griffin | G06F 21/602 |
| | | | 713/189 |
| 2004/0117615 A1* | 6/2004 | O'Donnell | G06F 21/10 |
| | | | 713/155 |
| 2005/0102244 A1* | 5/2005 | Dickinson | G06F 21/32 |
| | | | 705/74 |
| 2005/0223216 A1 | 10/2005 | Chan et al. | |
| 2006/0149962 A1* | 7/2006 | Fountain | H04L 63/0428 |
| | | | 713/151 |
| 2007/0136603 A1* | 6/2007 | Kuecuekyan | G06F 21/6218 |
| | | | 713/185 |
| 2009/0089803 A1* | 4/2009 | Biggs | G06F 21/554 |
| | | | 719/318 |
| 2010/0257351 A1 | 10/2010 | O'Connor et al. | |
| 2011/0167102 A1 | 7/2011 | Matzkel et al. | |
| 2011/0283110 A1 | 11/2011 | Dapkus et al. | |
| 2011/0306320 A1 | 12/2011 | Saunders et al. | |
| 2012/0173885 A1 | 7/2012 | Acar et al. | |
| 2012/0254616 A1 | 10/2012 | Brown | |
| 2013/0013921 A1 | 1/2013 | Bhathena et al. | |
| 2013/0246791 A1 | 9/2013 | Di Crescenzo | |
| 2014/0189797 A1* | 7/2014 | Nori | H04L 63/0807 |
| | | | 726/4 |
| 2014/0229729 A1* | 8/2014 | Roth | H04L 63/0471 |
| | | | 713/153 |
| 2014/0281487 A1* | 9/2014 | Klausen | G06F 21/602 |
| | | | 713/153 |
| 2014/0281553 A1 | 9/2014 | Illion et al. | |
| 2014/0380429 A1* | 12/2014 | Matsugashita | H04L 63/0823 |
| | | | 726/4 |
| 2015/0089244 A1 | 3/2015 | Roth et al. | |
| 2016/0127352 A1* | 5/2016 | Xu | H04L 63/0815 |
| | | | 726/8 |
| 2016/0277400 A1* | 9/2016 | Maurya | H04L 63/0807 |
| 2016/0294553 A1 | 10/2016 | Hattori et al. | |
| 2016/0366113 A1* | 12/2016 | Dawoud | H04L 63/0471 |
| 2017/0262546 A1 | 9/2017 | Chen et al. | |
| 2017/0295398 A1 | 10/2017 | Delahaye et al. | |

* cited by examiner

AUTHORIZING DELEGATED CAPABILITIES TO APPLICATIONS IN A SECURE END-TO-END COMMUNICATIONS SYSTEM

RELATED APPLICATIONS

This application claims the benefit of Provisional Application No. 62/399,987, filed on Sep. 26, 2016, which is incorporated herein by reference.

TECHNICAL FIELD

The disclosed embodiments relate generally to computer communications and, more specifically, to securely enabling applications to act within a secure communications infrastructure.

BACKGROUND

Users often communicate with each other over the Internet in an unsecure manner. Unsecure communications are acceptable for many purposes where the information communicated is of a non-sensitive nature.

However, there are many contexts in which the information communicated is actually or potentially sensitive, such as when communicating confidential business details, conducting e-commerce, and the like. In such contexts, the communicating users should employ systems with cryptographic capabilities that can encrypt and decrypt the communicated information. This prevents intermediate parties—such as active eavesdroppers, or systems such as routers that make up the Internet architecture—from being able to obtain the communicated information in its original plaintext form.

The cryptographic infrastructure needed to allow users to easily and transparently secure their communications can be complex. Delegation of cryptographic functionality entails a certain degree of trust of the infrastructure components that provide the functionality. Accordingly, a third-party organization providing the cryptographic functionality may be able to exploit this trust to obtain the original, unencrypted communications. Such a risk may not be acceptable to some users, e.g., when conducting highly sensitive communications.

Additionally, a user may prefer not to be limited to manually interacting with the cryptographic infrastructure. For example, rather than directly sending a message using a user interface of a cryptographically-secure system, the user may wish to allow third-party applications that the user trusts to use the cryptographic infrastructure to send messages on the user's behalf. However, allowing a third-party application to have access to sensitive information, such as cryptographic keys, potentially poses a security risk.

SUMMARY

An organization that wishes its messages to be secure (the "communicating organization") uses services of a secure communications infrastructure to securely exchange communications among its users. The secure communications infrastructure allows users (or administrators) of the communicating organization to delegate to third-party applications the permission to act on behalf of the users when using the secure communications infrastructure. The delegation may be accomplished at a very granular level, specifying the particular applications that are authorized to act on behalf of a user, the particular operations that those applications are authorized to perform, and/or in which contexts the applications may perform the operations.

An agent component executes on behalf of the communicating organization—either within the network of the communicating organization, or from a remote location administered by a provider of the secure communications infrastructure—and acts as an intermediary between third-party applications and the core of the secure communications infrastructure. This permits the third-party application to take actions on behalf of the user, while also preventing the third-party applications from obtaining the security-specific data that could lead to a breach of security.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

Figure 1:
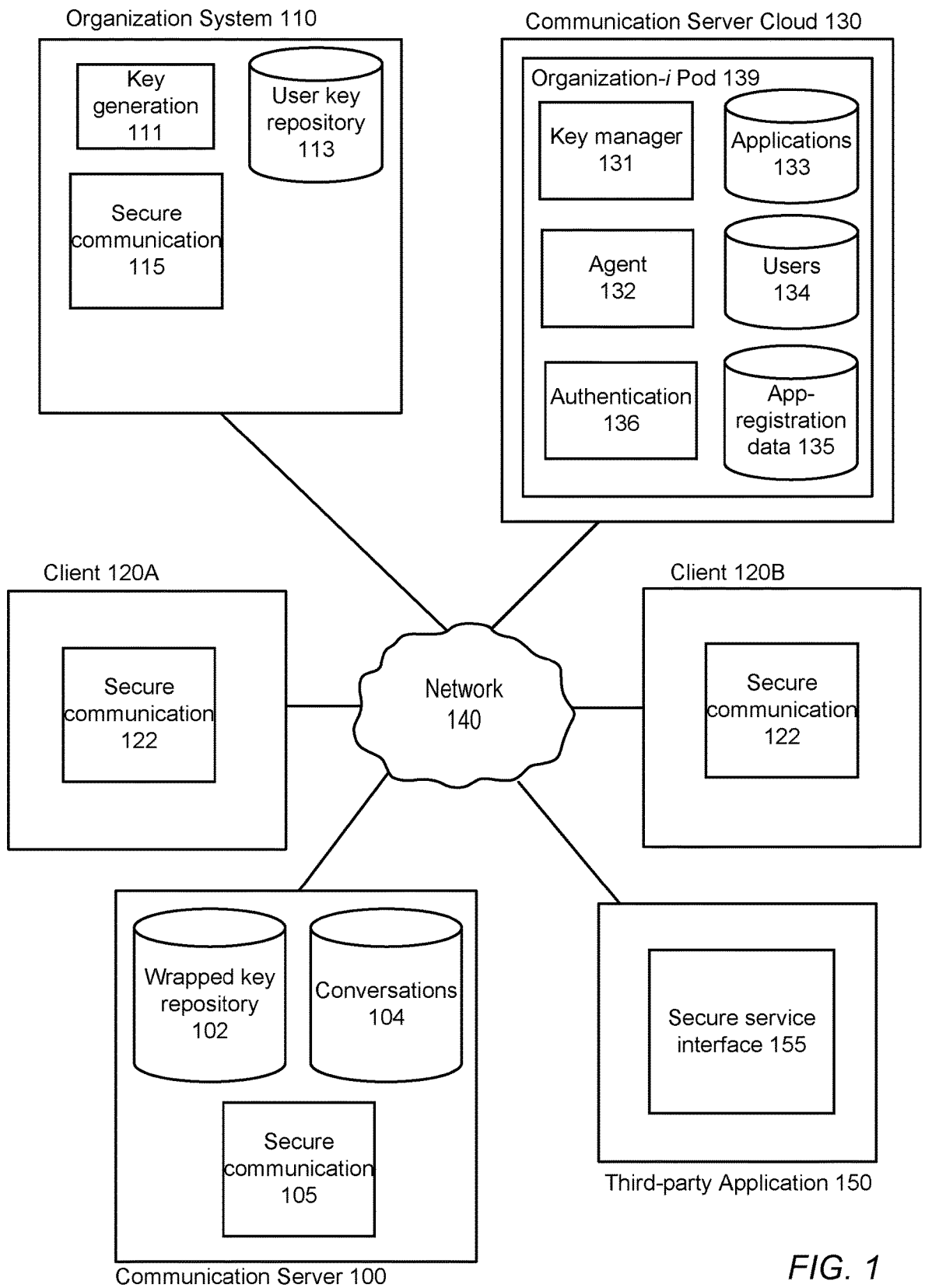
FIG. 1 shows a system environment in which secure communications takes place, according to one embodiment.

FIG. 1 shows a system environment in which secure communication takes place, according to one embodiment. Users of an organization that wishes its messages to be secure (the "communicating organization") send secure messages between their various client devices 120. To achieve the desired security, the client devices 120 use services of a secure communications infrastructure. The secure communications infrastructure is implemented by the interactions of several different components, including an organization system 110 under the control of the communicating organization, and a communication server 100 under the control of a security organization, as well as secure communication modules 122 installed on the client devices 120.

Additionally, users of the organization may wish not only to directly use the services of the secure communication infrastructure (e.g., via a user interface provided by the components of the secure communication infrastructure), but also to enable third-party applications of the users to have access to the secure communication infrastructure and (more specifically) to act on behalf on the users using the secure communication infrastructure. Accordingly, an organization wishing to allow such "on behalf" of delegation of user capabilities on the secure communication infrastructure to third-party applications hosts an agent component 132 that acts as a trusted intermediary between the third-party applications and the components of the secure communication infrastructure. In some embodiments, the agent component 132 is created by the security organization that is responsible for the communication server 100. In some embodiments, the organization has the option of hosting organization-specific components directly within the organization system 110, or (alternatively) within "the cloud" on a communication server cloud 130 configured for the organization. Accordingly, in such embodiments the organization can choose whether the agent component 132 will be hosted in the communication server cloud 130 (as illustrated in the embodiment of FIG. 1) or within the organization system 110.

The organization system 110 is administered by the communicating organization, such as a business, educational institution, or governmental entity. The organization system 110 includes a key generation module 111 that generates cryptographic keys for use by its users when they securely communicate. The generated keys are stored (in encrypted form) in a user key repository 113. In one embodiment, the keys include an account key for each user, and a conversation key for each conversation in which the user can participate. As explained in more detail below, a "conversation" has a corresponding set of users that may participate in it and includes the messages exchanged between the participant users as part of that conversation. The organization system 110 also includes a secure communication module 115 that implements security protocols for interacting with the client devices 120 and communication server 100 to provide clients with secure communication capability.

The key generation module 111 and the key repository 113, as well as the secure communication module 115, may be implemented in different ways in different embodiments. For example, in one embodiment the key generation module 111, the key repository 113, and the secure communication module 115 are all implemented in hardware by a hardware security module (HSM) located on the premises of the communicating organization, which increases security of the keys. In other embodiments, the key generation module 111 and the secure communication module 115 are implemented in software, and the key repository 113 is stored in standard storage media, without any special hardware protection layer. Although the various components of the organization system are illustrated in FIG. 1 as being part of the organization system 110, in some embodiments they may be physically present in "the cloud" and accessed by the organization system 110 via the network 140.

In some embodiments, the key generation module 111 regenerates the cryptographic keys at different times, e.g., at a fixed time interval. In such embodiments, the user key repository 113 stores, for each user and each key for that user, a set of entries. Each entry includes the key itself and the time period during which the key is valid. For example, in cases where the conversation keys for users are rotated daily, the entries for user's conversation key include the conversation key and an indication of the day for which the key is valid. Then, when a user sends a new message as part of a conversation, the user's current conversation key is used; to decrypt an old message, the conversation key corresponding to the sending time of the old message is obtained and used to decrypt the old message.

In some embodiments, keys are generated from other keys, such as the conversation keys for a particular organization system 110 being derived in part based on the account key for that organization system. In some embodiments, older keys are deleted from the key repository 113 after the expiration of some key retention period (e.g., three months), and the data with which the deleted keys were encrypted may optionally also be deleted. Whether or not the encrypted data is deleted, as long as the encryption keys themselves (and any keys from which they were generated) have been deleted, the encrypted data cannot be decrypted.

The communication server 100 facilitates secure communications between the client devices 120 of users who are members of the communicating organization. For example, in embodiments in which the users communicate with each other via multi-user conversations, the communication server 100 includes a conversations repository 104 that stores metadata defining the conversations, as well as the (encrypted) messages that have been exchanged as part of the conversation. As previously noted, a conversation has a corresponding set of users that may participate in it and includes the messages exchanged between the participant users as part of that conversation. Thus, in one embodiment each conversation in the conversations repository 104 has corresponding metadata including a name of the conversation (e.g., "Project X negotiations", or "Sales team—Europe") and identifiers of a set of users of the organization system 110 that are permitted to participate in the conversation. The conversations repository 104 further stores the messages that have previously been exchanged between the various participants in a conversation. (As described below, the messages are exchanged in encrypted form, and thus the messages stored in the conversations repository 104 are likewise encrypted and hence not readable by the communication server 100 itself.) In one embodiment, for enhanced security an administrator of the organization system 110, or another user with similarly high access privileges, establishes the conversations, adding to the conversation those users that should be eligible participants in, and audiences for, the conversation.

The communications server 100 includes a secure communications module 105 that facilitates communications between the various client devices 120. For example, and as illustrated below in more detail with respect to FIG. 2, in some embodiments the secure communications module 105 authenticates users of the organization system 110 and subsequently vouches for their identities, stores and provides encrypted keys, and performs other operations allowing users' client devices 120 to obtain appropriate cryptographic keys. As another example, illustrated below in more detail with respect to FIG. 3, the secure communications module 105 also distributes any messages sent by clients as part of conversations.

For instance, assume that a user A is using the client device 120A to send messages for the "Project X negotiations" conversation, and the "Project X negotiations" conversation is defined as having participant users A, B, and C. The secure communications module 105 may receive a (encrypted) message from user A as part of that conversation, and accordingly distribute the same messages to users B and C (the other participants in the conversation), as well as saving a copy of the message in the conversations repository 104 in association with the "Project X negotiations" conversation.

The communication server 100 additionally includes a wrapped key repository 102 populated with user cryptographic keys as a result of operations such as those illustrated in FIG. 2, below. The conversation keys of the users are "wrapped"—that is, stored in encrypted form—using keys not available to the communication server 100. (In some embodiments, other cryptographic keys of the users may be wrapped as well.)

The client devices 120 of the users are computing devices with sufficient ability to communicate over the network 140, e.g., with the communication server 100. Laptop or desktop computers, personal digital assistants, smartphones, tablet computers, and the like are examples of possible client devices 120. The client devices 120 each have a secure communication module 122 that allows the client devices to perform cryptographic operations and communicate with the communication server 100 to securely exchange messages. Actions of the client devices 120 illustrated in FIGS. 2-3, below, are examples of the operation of the secure communication module 122.

The client devices 120, the organization system(s) 110, and the communication server 100 communicate with each other through a network 140. The network may be any suitable communications network for data transmission. In one embodiment, the network 140 is the Internet and uses standard communications technologies and/or protocols.

In one embodiment, the security organization administering the communication server 100 also provides the organization system 110 with the software that implements the key generation module 111 and the secure communication module 115, and provides the client devices 120 with the software that implements the secure communication modules 122, as well as providing the agent component 132. The secure communication infrastructure is implemented through the interactions of these components.

It should be understood that although for simplicity FIG. 1 depicts only one organization system 110 and two client devices 120 for the communication server 100, there could be any number of each. For example, the communication server 100 could serve any number of organization systems 110, and each organization system 110 could have any number of users and client devices 120. There may likewise be multiple communication servers 100.

Note that since the cryptographic keys (at least conversation keys) of users are wrapped before being stored in the wrapped key repository 102 on the communication server 100, even though the communication server 100 stores the user keys, the communication server cannot access the actual unencrypted values of the keys. Hence, the communication server 100, even though acting as the facilitator of encrypted communications, need not be trusted by the users. For example, since the communication server 100 lacks access to the original unencrypted values of user cryptographic keys such as the conversation keys, the communication server cannot use the keys to obtain access to messages of the users that were encrypted using those conversation keys; that is, the user messages are undecipherable with respect to the communications server. Accordingly, there is no danger that employees of the communication server will abuse their privileged position to learn user secrets, or that the communication server itself could systematically read user conversations.

In one embodiment, a communication server cloud 130 is hosted outside of the communication server 100 and stores, for a particular organization, the applications 133 of that organization, as well as information 134 about the users of the organization, such as their identities (e.g., usernames), credentials (e.g., passwords), roles/permissions, and the like. In one embodiment, the communication server cloud 130 additionally stores a key manager 131 and an agent component 132; in other embodiments, the key manager and agent are alternatively part of the organization system 110. The key manager 131 permits secure access to keys of the organization (account and conversation keys), and the agent component 132 carries out requests requiring the use of cryptographic or other secure operations—such as sending encrypted messages—on behalf of third-party applications.

Users may wish for the third-party applications 150 that they use to be able to use the secure communications infrastructure on their behalf. For example, for a third-party application 150 that a user uses to perform financial research, the user may wish to have the third-party application securely share results of the financial research directly with the user's colleague, thereby sparing the user substantial difficulty of attempting to somehow manually replicate and share those results using the user interfaces provided by the secure communications infrastructure. The third-party applications 150 make use of the agent component 132 in order to gain access to the security communication infrastructure, as will be described in more detail below with respect to FIGS. 5A and 5B.

In addition to the applications 133 and user information 134, the organization-specific data includes application registration data 135, which stores information indicating which third-party applications have been registered for delegated use on behalf of which users, as well as related data such as the digital certificates of the third-party applications, and/or the permissions that the third-party applications requires to function properly. In some embodiments, the application registration data 135 additionally indicates properties of a particular user/third-party application registration, such as the specific operations of the secure communications infrastructure that the application has been permitted to perform on behalf of the user. In one embodiment, for example, the possible operations for a third-party application with respect to the user include: acting as the user; sending messages on behalf of the user; getting connection requests for the user; sending connection requests for the user; getting presence data (e.g., available, offline, do not disturb) for the user; setting presence data for the user; getting information about the user; and getting information about other users through user look-up and search.

The components that are illustrated in the embodiment of FIG. 1 as being part of the communication server cloud 130, but that in some embodiments could be partially or entirely hosted on-premises within the organization system 110, are referred to herein as the organization-i pod 139, denoting that they are the modules and data specific to a particular organization—the ith organization of the n organizations supported by the secure communications server 100.

The third-party applications may be implemented in different manners in different embodiments. For example, in some embodiments, the third-party applications 150 are local desktop-based/native applications running directly on the client devices 120 of the users. In some embodiments, the third-party applications 150 are within the applications 133 running on the communication server cloud 130 for a given organization. In some embodiments (illustrated in FIG. 1), the third-party applications 150 are hosted on separate computer systems administered by third parties and accessible over the network 140 (e.g., web-based applications). In any case, the third-party application 150 has a secure service interface module 155 that handles interactions with the secure communication infrastructure (e.g., with the agent component 132) in order to allow the third-party application to use the services of the secure communication infrastructure.

Example Interaction Sequence for Key Exchange and Secure Messaging

Figure 2:
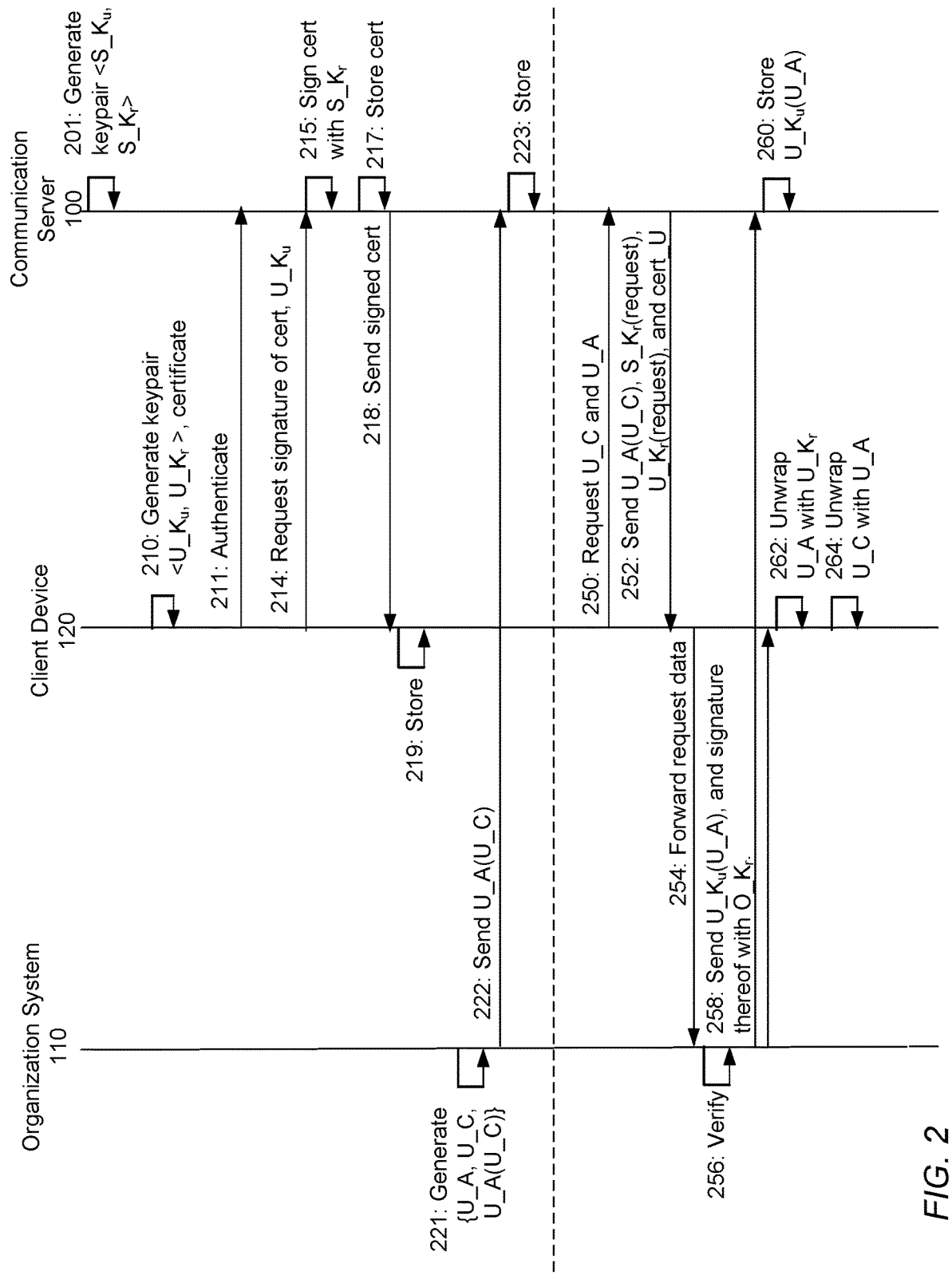
FIG. 2 is a sequence diagram illustrating interactions between the different entities of FIG. 1 as part of generating and exchanging cryptographic keys, according to one embodiment.

FIG. 2 is a sequence diagram illustrating interactions between the different entities of FIG. 1 as part of generating and exchanging cryptographic keys, according to one embodiment. FIG. 2 illustrates several distinct phases involved in a client device 120 ultimately obtaining a conversation key that will permit it to participate in a secure conversation with other client devices. In a preliminary user registration phase including steps 210-219, a new user is registered, permitting the user to gain access to secure communications of the communicating organization. In a key generation phase including steps 221-223, the organization system 110 generates the cryptographic keys for the new user. And in a key obtaining phase including steps 250-264, the client device 120 of the user requests a conversation key so that it can communicate as part of a conversation with a particular set of other users included in the conversation.

Initially, the communication server 100 generates 201 a keypair consisting of a public key and private key, hereinafter referred to as $S\_K_u$ (server's public key) and $S\_K_r$ (server's private key, corresponding to the public key). The generation of $S\_K_u$ and $S\_K_r$ may be accomplished using algorithms such as RSA (Rivest-Shamir-Adleman), and need not occur frequently, e.g., only once.

In the user registration phase (steps 210-219), a new user, using a client device 120, registers to use the organization system (or is registered by an administrator, for example). The new user's client device 120 generates 210 a keypair $U\_K_u$ (the new user's public key) and $U\_K_r$ (the new user's private key, corresponding to the public key) and a digital certificate for the new user that includes the public key $U\_K_u$.

In order to gain full access to communications, the new user establishes himself/herself with the communication server 100. Accordingly, the user's client device 120 (typically with input specified by the new user) authenticates 211 with the communication server 100, such as by providing a password or shared secret, or by using single sign-on (SSO). Assuming that the client device 120 successfully authenticates itself with the communication server 100 at step 211, the client device 120 then requests 214 that the communication server 100 sign the digital certificate that includes $U\_K_u$. The communication server 100 then signs 215 the digital certificate as requested, e.g., by applying a hash function to the digital certificate and applying its private key $S\_K_r$ to the resulting hash value. The signature serves as an indication that the communication server 100 vouches for the correctness of the digital certificate, including the binding of the new user to the new user's public key $U\_K_u$. The communication server 100 then stores 217 the signed digital certificate within its key repository 102 and sends 218 the signed certificate back to the client device 120, which likewise stores 219 the certificate in its local storage.

In the key generation phase (steps 221-223), the organization system 110 of the communicating organization ensures that each of the users of the communicating organization has appropriate cryptographic keys for communication. Specifically, the organization system 110 generates 221, for each of the users of the communicating organization that has registered, or been registered by an administrator with the communication server 100—including, for example, the new user of steps 210-219—a user account key $U\_A$, storing it in the user key repository 113. For each of the users, and for each of the established conversations of which the user is a member, the organization system 110 also generates 221 a conversation key $U\_C$ to use for cryptographic operations for that conversation. In one embodiment, the account key $U\_A$ and the conversation keys $U\_C$ for a user are re-generated at some preset time interval (e.g., daily), leading to a rotated set of account keys and conversation keys for that user, each key corresponding to a particular time period. Key rotation enhances security by ensuring that if the key is somehow obtained by an unauthorized party, it will only be usable for the particular time period to which it corresponds (e.g., a particular day). For each of the established conversations of which a user is a member, the organization system 110 encrypts the corresponding conversation key $U\_C$ with the user's account key $U\_A$, thereby generating $U\_A(U\_C)$—that is, the key $U\_C$, as encrypted using the key $U\_A$. (The notation k(data) is employed herein as shorthand for f(k, data), where f( ) is a cryptographic transformation, such as encryption or decryption using symmetric-key algorithms such as AES256 (Advanced Encryption Standard, 256-bit), or signature/verification using asymmetric-key algorithms such as RSA, that transform the value data using the key k.) The organization system 110 sends 222 this encrypted conversation key for delivery to the communication server 100, which stores 223 the encrypted key in the user key repository 113 in association with the user and conversation. Note that since the key $U\_C$, as well as $U\_A$, is stored only on the organization system 110, with the communication server 100 storing only the encrypted key $U\_A(U\_C)$, the communication server 100 does not have direct access to $U\_C$ (or $U\_A$), and hence cannot use $U\_C$ to read the content of the user's encrypted conversations.

In the key obtaining phase (steps 250-264), the user of a client device 120 obtains the user's current conversation key $U\_C$ for a particular conversation so that the user can participate in that conversation. (The user may need to obtain $U\_C$, and $U\_A$, after they have first been generated or rotated by the organization system 110, for example; thereafter, the user's client device 120 can cache $U\_C$ and $U\_A$ while they remain valid, assuming that the client device 120 can retain state.) To this end, the user's client device 120 requests 250 the user's conversation key $U\_C$ by sending a message embodying the request ("mReq_U_C") to the communication server 100, along with $U\_K_r(mReq\_U\_C)$—the request as signed by the user—which verifies that the user is the source of the request. Further assuming that the user's client device 120 has not yet obtained $U\_A$, the user's client device 120 additionally requests 250 the user's account key $U\_A$ by sending a message embodying the request ("mReq_U_A") to the communication server 100, along with $U\_K_r(mReq\_U\_A)$—the request as signed by the user.

The communication server 100, which previously stored the encrypted conversation key, $U\_A(U\_C)$, verifies the request mReq_U_C as coming from the user by verifying the signature $U\_K_r(mReq\_U\_C)$ using the user's public key, $U\_K_u$, which it had stored at step 217 as part of the digital certificate. Assuming that verification is successful, the communication server 100 sends 252 the value U_A(U_C) for delivery to the client device 120.

However, given the assumption that the client device 120 has not yet obtained U_A, the client device cannot obtain U_C from the value U_A(U_C). Accordingly, in response to mReq_U_A, the communication server 100 also sends 252, for delivery to the client device 120, the values $S\_K_r$ (mReq_U_A) and $U\_K_r$(mReq_U_A)—the request for U_A as signed by the communication server 100 and by the user, respectively. The communication server 100 also sends cert_U, the certificate of the user that it signed at step 215 and stored at step 217. The client device 120 then forwards 254 these data to the organization system 110.

Upon receipt of the data from step 254, the organization system 110 verifies 256 that the requests are indeed from the communication server 100 by applying the well-known public key of the communication server, $S\_K_u$, to the received signature $S\_K_r$(mReq_U_A) and ensuring that the result matches the received request mReq_U_A. Similarly, the organization system 110 verifies 256 that the requests originated from the user by applying the public key of the user, $U\_K_u$, to the received signature $U\_K_r$(mReq_U_A) and ensuring that the result matches the received request mReq_U_A. (If the organization system 110 does not already have $U\_K_u$, $U\_K_u$ may in turn be obtained from the certificate cert_U, after the organization system 110 verifies cert_U by verifying the signature of the communication server 100 on cert_U.)

If the verification of step 256 is successful, the organization system 110 has established that the request for U_A did indeed originate with the user. Accordingly, the organization system 110 obtains the account key U_A for the user from the user key repository 113, encrypting it so that only the user can obtain it by applying the user's public key to produce $U\_K_u$(U_A). The organization system 110 also signs the encrypted key with its own private key, $O\_K_r$, producing the value $O\_K_r(U\_K_u(U\_A))$. (For simplicity of explanation, it is assumed that the communications server 100 has previously obtained the public key $O\_K_u$, corresponding to the private key $O\_K_r$.) The organization system 110 sends 258 the values $U\_K_u(U\_A)$ and $O\_K_r(U\_K_u(U\_A))$ to the communication server 100, and also (either directly, or via the communication server 100) to the client device 120.

The communication server 100 verifies that the value $U\_K_u$(U_A) came from the organization system 110 by applying $O\_K_u$ to the signed $O\_K_r(U\_K_u(U\_A))$, storing 260 the value $U\_K_u$(U_A) if verification is successful. With $U\_K_u$(U_A) stored, the communication server 100 can in the future provide it directly, omitting steps 252-258, should a client device 120 again request U_A during the time period in which U_A is still valid, such as when obtaining conversation keys U_C for other conversations.

After obtaining $U\_K_u$(U_A) from the organization system, the client device 120 unwraps 262 U_A by applying its own private key, $U\_K_r$, to $U\_K_u$(U_A), and then unwraps 262 U_C by decrypting U_A(U_C), which it received at step 252, with U_A.

At this point, the client device 120 has the user's conversation key, U_C, for the desired conversation. The user can accordingly send and receive messages in the conversation, and the client device 120 can encrypt and decrypt the messages using U_C, as is now illustrated in FIG. 3.

It is understood that although FIG. 2 illustrates the operations occurring in a particular order, other variations are possible. For example, certain operations are performed in FIG. 2 so as to avoid the communication server 100 directly communicating with the organization system 110, since many administrators of such systems 110 prefer to avoid direct server-to-server connections. For organization systems 110 not prohibiting server-to-server communications, certain of the communications illustrated in FIG. 2 could be delivered directly by the communication server 100 to the organization system 110 without using the client device 120 as an intermediary, for example.

Figure 3:
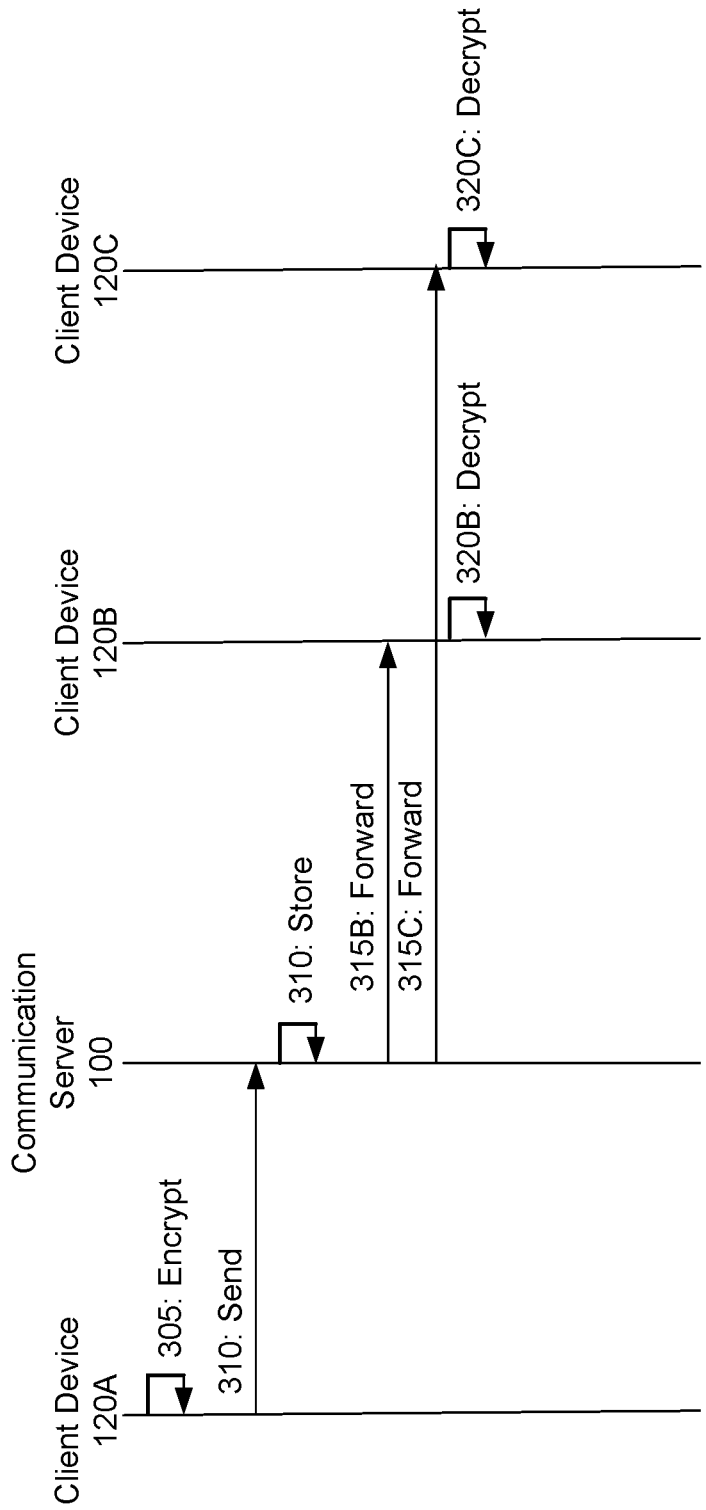
FIG. 3 illustrates interactions of the communication server and client devices of FIG. 1 when exchanging a message as part of a conversation, according to one embodiment.

FIG. 3 illustrates interactions of the communication server 100 and client devices 120 when exchanging a message as part of a conversation, according to one embodiment.

In the example scenario illustrated in FIG. 3, the devices 120A-C belong to three corresponding users (A, B, and C) who are registered with the organization system 110, and there is a conversation "Project X negotiations" defined in the conversations repository 104 for which users A, B, and C are the listed participants. Further assume that the client devices 120 have previously obtained the conversation keys for their respective users, e.g., as a result of the operations illustrated in FIG. 2.

When user A has composed a message to communicate as part of the conversation "Project X negotiations" and has specified that it should be sent, the client device 120A (via its secure communication module 122) encrypts 305 the message using the conversation key U_C previously obtained for that conversation. The client device 120A then sends 310 the encrypted message to the communication server 100.

The communication server 100 stores 310 the encrypted message as part of the messages for the conversation in the conversations repository 104. Since the message is encrypted with U_C, the original value of which can be accessed only by the organization system 110 and (as a result of the operations of FIG. 2) by the client 120A, the communication server 100 does not have access to the original plaintext of the message. The communication server 100 identifies the participant users in the conversation by consulting the metadata in the conversations repository 104, determines that user B and user C are also participants in the conversation, and accordingly forwards 315 the encrypted message to client devices 120B and 120C. (As an alternative to proactively forwarding the encrypted message to client devices 120B and 120C, the communication server 100 could merely store 310 the encrypted message in the conversations repository 104 and wait for the client devices 120 to request it.) Upon receipt of the encrypted message, the client devices 120B and 120C decrypt 320 the message using their own conversation keys U_C, which they likewise obtained through operations like those in FIG. 2, and further display the decrypted messages. Users B and C can then respond with their own messages in a similar fashion to those in steps 305-320.

Example Flows for Decrypting Messages

Figure 4A:
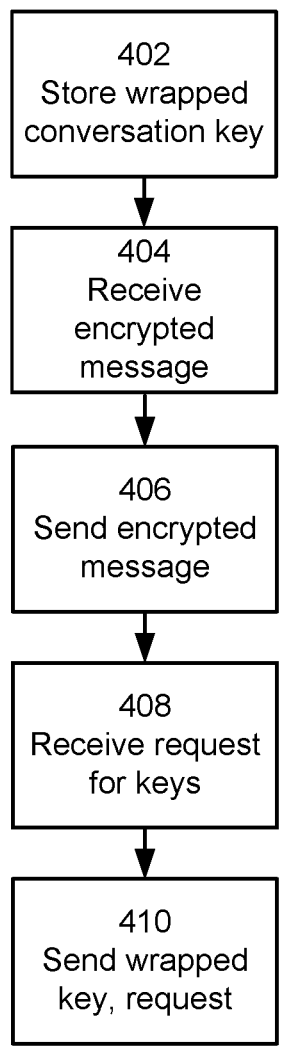
FIG. 4A is a flowchart illustrating steps performed by the communication server of FIG. 1 as part of the exchanging of messages and of data that allow the clients devices to decrypt the messages, according to one embodiment.

FIG. 4A is a flowchart illustrating steps performed by the communication server 100 of FIG. 1 as part of the exchanging of messages and of data that allow the client devices 120 to decrypt the messages, according to one embodiment.

The communication server 100 stores 402 a wrapped version of a conversation key, as described with respect to step 223 of FIG. 2. The wrapped version of the conversation key was generated at an organization system by encrypting the conversation key using an account key. The communication server 100 does not have the account key in unencrypted form, and hence cannot obtain the unwrapped conversation key.

The communication server 100 receives 404 an encrypted message from a first client device as part of a conversation, e.g., as described with respect to step 310 of FIG. 3, where the communication server receives an encrypted message from the client device 120A. The message was encrypted by the first client device using the conversation key and is undecipherable to the communication server 100. The communication server 100 then sends 406 the encrypted message for delivery to a second client device, e.g., as described with respect to step 315B of FIG. 3, where the communication server forwards the encrypted message to the client device 120B.

When the second client device 120 decrypts the message, if it does not already have the conversation key for the conversation of which the encrypted message is a part, the communication server 100 receives 408 a request for cryptographic keys (i.e., the conversation key, and an account key used to encrypt the conversation key into the wrapped version) from the second client device 120 over the network 140, e.g., as described with respect to step 250 of FIG. 2. Accordingly, the communication server 100 sends 410 the wrapped version of the conversation key for delivery to the second client device, and sends the request for the account key for delivery to the organization system, e.g., as described with respect to step 252 of FIG. 2.

If the organization system 110 verifies the request, it will send the account key (in encrypted form decryptable by the user corresponding to the account key) to the second client device. Using the account key, the second client device can obtain the conversation key, and use the conversation key to decrypt the message and display it in unencrypted form to the user of the second client device.

Figure 4B:
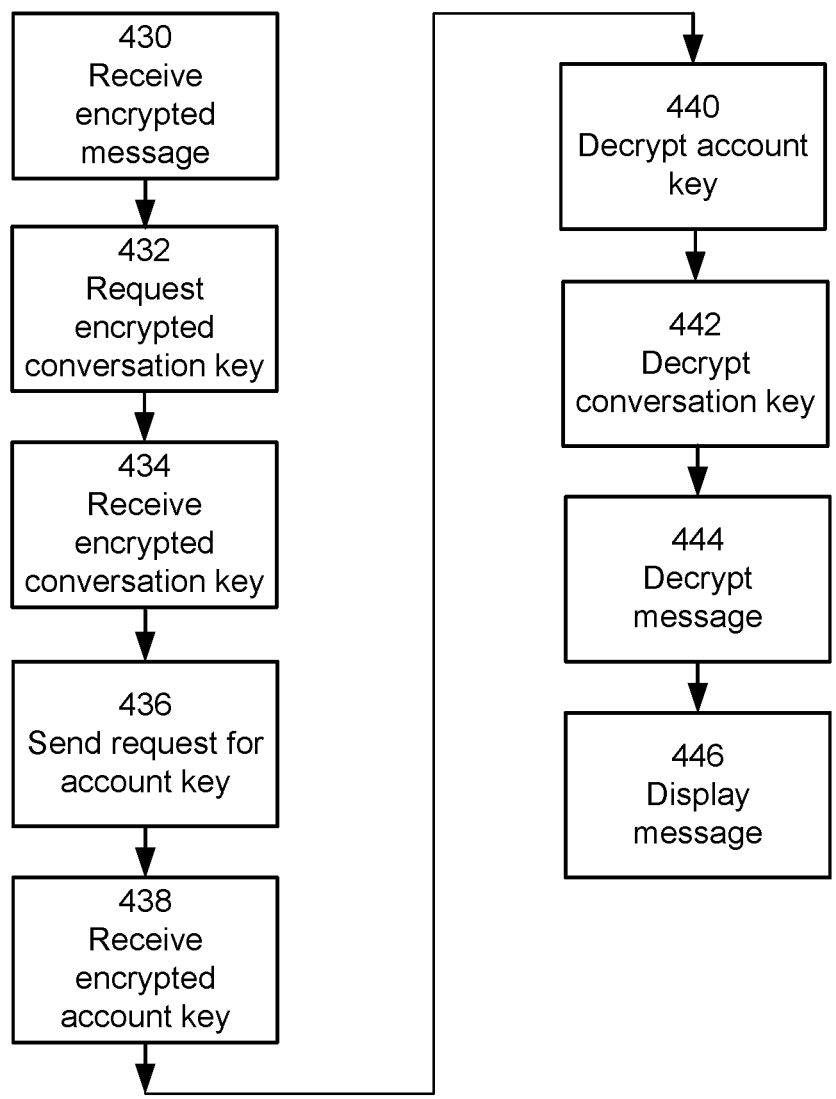
FIG. 4B is a flowchart illustrating steps performed by a client device of FIG. 1, such as the client device of FIG. 3, as part of decryption of a message, according to one embodiment.

FIG. 4B is a flowchart illustrating steps performed by a client device 120 of FIG. 1, such as the client device 120B of FIG. 3 or the second client device mentioned with respect to FIG. 4A, as part of decryption of a message, according to one embodiment.

The client device 120 receives 430 an encrypted message from another client device 120, e.g., as described with respect to step 315B of FIG. 3. The message is encrypted with a conversation key, and hence the recipient client device needs the conversation key to decrypt the message.

The client device 120 requests 432 the conversation key from a communication server 100 and receives the conversation key in encrypted form, e.g., U_A(U_C), as described with respect to steps 250 of FIG. 2.

Assuming that the client device 120 does not yet have the account key of its user, U_A, it cannot obtain U_C in plaintext form. Accordingly, the client device sends 436 a request for the account key U_A, e.g., as described with respect to step 252 of FIG. 2, and the request is ultimately delivered to an organization system 110, which verifies the request.

Assuming that the organization system 110 successfully verified the request for U_A, the organization system sends U_A to the client device 120, encrypted with the public key U_K_u of the user of the client device 120. The client device 120 receives 438 the encrypted account key U_A, and decrypts 440 U_A, e.g., as described with respect to step 262 of FIG. 2. Likewise, the client device 120 decrypts 442 the conversation key U_C, e.g., as described with respect to step 264 of FIG. 2.

The client device 120 then decrypts 444 the message using the conversation key. The client device 120 can then display 446 the message to the user in a user interface.

The steps of FIGS. 4A and 4B may be performed in a different order than those depicted, as well. For example, the communication server 100 may perform steps 408 and 410 of FIG. 4A before the encrypted message is received at step 404. As another example, the client device 120 may perform steps 432-444 of FIG. 4B before step 430.

Application Delegation

Figure 5A:
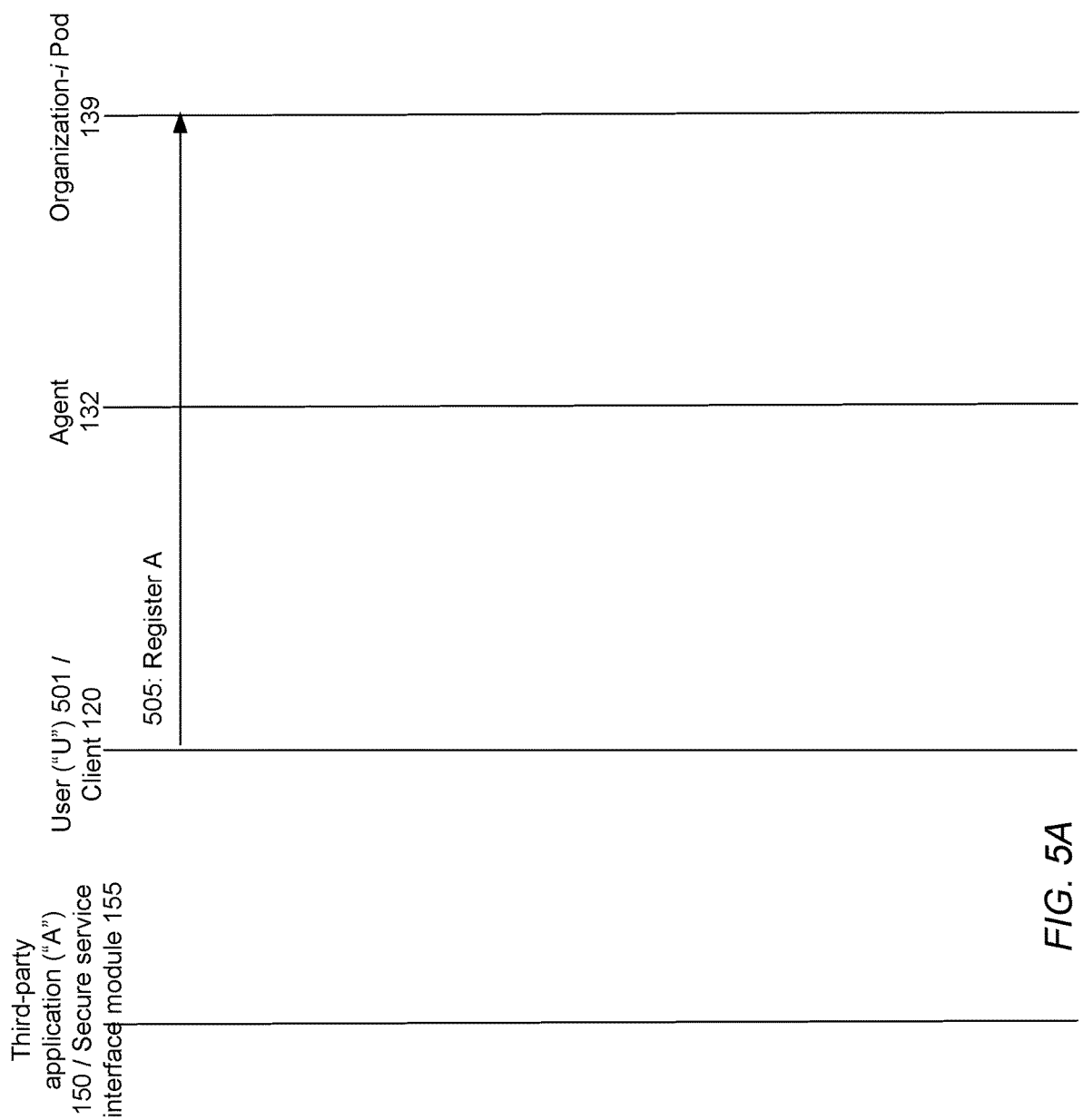
FIGS. 5A and 5B illustrate operations performed as part of application delegation—that is, permitting third-party applications to use the secure communications infrastructure on behalf of the user, while still maintaining system security (e.g., by not providing the third-party applications with direct access to user keys)—according to some embodiments.
Figure 5B:
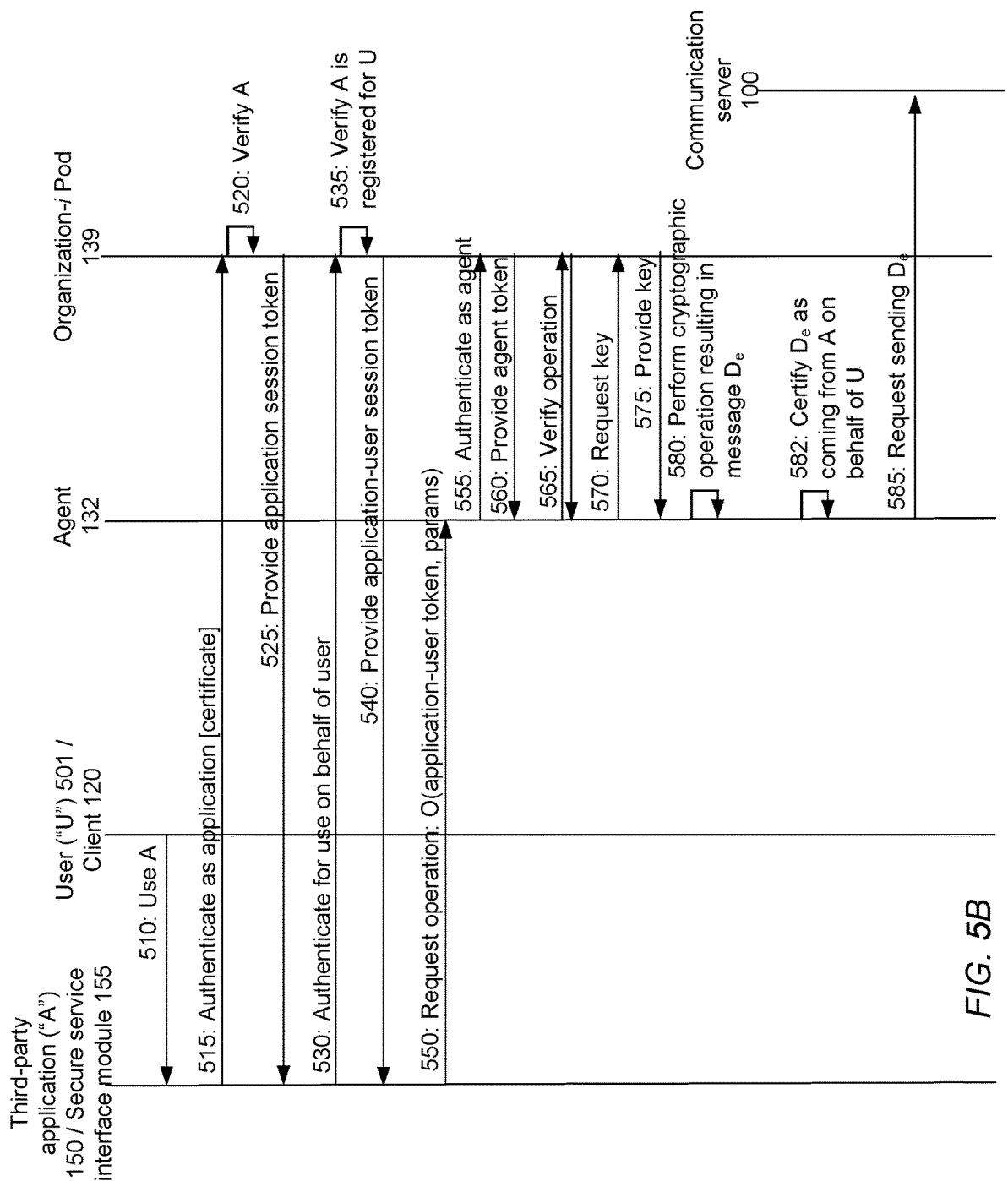

FIGS. 5A and 5B illustrate operations performed as part of application delegation—that is, permitting third-party applications 150 to use the secure communications infrastructure on behalf of the user, while still maintaining system security (e.g., by not providing the third-party applications with direct access to user keys)—according to some embodiments.

FIG. 5A illustrates interactions of the various entities of FIG. 1 when performing the preliminary establishment of application delegation for a particular third-party application on behalf of a particular user, according to some embodiments.

A third-party developer develops a third-party application 150, such as a desktop application for performing financial research. The third-party developer desires that the third-application 150 be able to use the secure communication infrastructure, and accordingly includes a secure service interface module 155 as part of the third-party application. The third-party developer also generates or otherwise obtains a cryptographic certificate (e.g., an X.509 certificate) that includes a public key and an identity of the third-party developer.

A user who belongs to a particular organization and wishes to allow a particular third-party application 150 to use the secure communication infrastructure on behalf of a user registers 505 the application with the secure communications infrastructure. (Depending on the policies of the organization, the user who registers may be the user 501 on behalf of whom the third-party application is being registered for use, or a different user, such as an administrator of the organization, for example.) In some embodiments, registration 505 includes providing at least the public key of the digital certificate of the third-party application, and optionally the permissions that the third-party application requires. Registration 505 may also include indications of which of the various operations supported by the secure communications infrastructure may be performed by the third-party application 150 on behalf of the user 501. The registration information is stored in the application-registration data 135.

FIG. 5B illustrates interactions of the various entities of FIG. 1 when a third-party application performs an operation on behalf of a user, according to some embodiments.

The user 501 uses 510 the third-party application to accomplish some result that requires uses of the secure communication infrastructure. For example, in a third-party application 150 that is a financial research application, the user might use a "Securely share this research report" feature to share the current research report with another user in encrypted form so that only the other user can decrypt and view the report.

Assuming that the third-party application 150 does not already have a session established with the organization pod 139, the secure service interface module 155 of the third-party application 150 authenticates 515 itself with the organization pod 139 by sending a session initiation request including the digital certificate of the third-party application, or a portion of the information thereof, to the organization pod 139. An authentication module 136 of the organization pod 139 verifies 520 the third-party application 150 using the public key and/or digital certificate obtained in step 505 of FIG. 5A. In some embodiments, the verification requires the application 150 to present a client digital certificate and uses client certificate authentication and the digital certificate for the public key to establish a secure socket layer (SSL) connection. After verification, the authentication module 136 creates a session information data structure and an application session token corresponding to the third-party application, and provides 525 the application session token back to the secure service interface module 155.

Assuming that the third-party application 150 has not already been authenticated as being permitted to act on behalf of the user 501, the secure service interface module 155 of the third-party application 150 authenticates 530 itself for use on behalf of the user, passing the application token that it received at step 525 as the means to identify itself (Unlike steps 515-525, the authentication 530 establishes a session in which the third-party application 150 is permitted to act on behalf of the user 501, in particular, as opposed to establishing a general session for the third-party application 150 to be permitted to communicate with the secure communication infrastructure, in general.) The authentication module 136 of the organization pod 139 accordingly verifies 535 that the third-party application 150 is authorized to act on behalf of the user 501, e.g., that the application registration data 135 indicates that the user has registered the third-party application to allow such delegation. If so, the authentication module 136 accordingly provides 340 an application-user session token back to the secure service interface module 155.

After obtaining and caching the application session token (which establishes that the third-party application has been identified by the organization pod 139 and allowed to interact with it for some period) and the application-user session token (which establishes that the third-party application has been allowed to act on behalf of the given user for some period), the third-party application may take actions on the secure communications infrastructure on behalf of the user.

The secure service interface module 155 of the third-party application 150 determines which operation(s) of the secure communications infrastructure are required by the user's use of the application at step 510, such as the operation "send message as user" (e.g., sending an encrypted form of the research report of the previous example). The secure service interface module 155 accordingly sends 550 a request for the operation(s), along with the application-user token and any operation-specific parameters required by the operation.

Assuming that the agent component 132 does not currently have a valid session with the organization pod 139, the agent component 132 authenticates 555 as an agent, passing its agent digital certificate to the organization pod 139. The authentication module 136 verifies the agent digital certificate and provides 560 the agent component 132 with an agent session token, which the agent component 132 can cache for future use during the agent session.

In embodiments in which individual operations of the secure communications infrastructure may be permitted or denied, the agent component 132 identifies the third-party application 150 and user 501 based on the application-user token and verifies 565 that the requested operation(s) is one that the third-party application has been authorized to perform on behalf of the user. (This may be determined by requesting the authentication module 136 of the organization pod 139 to consult the application registration data 135 for that application 150, user 501, and operation.)

In step 570, the agent component 132 requests the user's conversation key, U_C, so that the agent can perform the operation(s) on behalf of the user. (It is assumed in this example that the required operation(s) is one that uses the conversation key, such as a "send message as user" operation.) The key manager 131 of the organization pod 139 accordingly obtains U_C and provides 575 it to the agent component 132. (In some embodiments, the agent component 132 must first obtain a key manager token from the key manager 131 before requesting 570 keys.)

Using U_C, the agent component 132 performs 580 the requested (cryptographic) operation, such as encrypting the given financial report. This results in encrypted data $D_e$, which the agent component 132 can then request 585 the communication server 100 to send to a recipient user (e.g., as specified in association with the operation requested in step 550), as part of a process such as that of FIG. 3 (e.g., step 310).

In some embodiments, before requesting the communication server 100 to send $D_e$, the agent component 132 may certify 582 $D_e$ as coming from the third-party application 150 on behalf of the user 501, such as by inserting text to that effect into the message, adding metadata signed with the private key of the agent component 132, or the like.

It is understood that the steps of FIG. 5B represent one way in which a third-party application 150 can perform an operation on behalf of a user 501, and that other variations are possible, as well. For example, in some embodiments the secure service interface module 155 need not obtain the application session token before obtaining the application-user session token.

Additionally, the agent component 132 has been illustrated in FIGS. 5A and 5B as being separate from other components of the organization pod 139 for purposes of explanation, given its particular role in facilitating actions of the third-party application 150 on behalf of the user.

Figure 6:
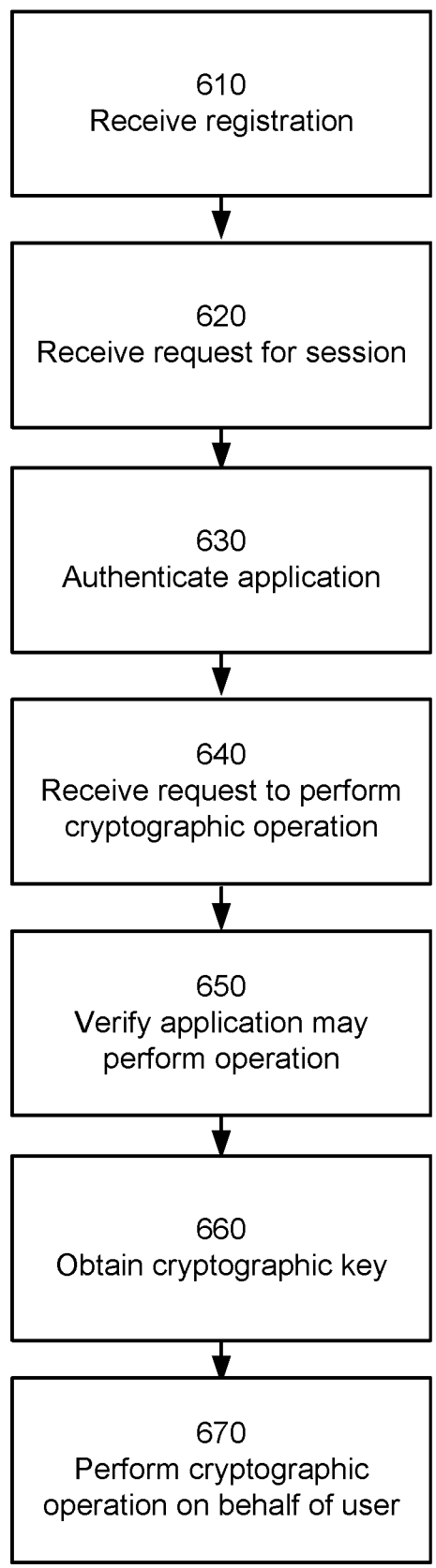
FIG. 6 is a flowchart illustrating steps of the organization pod (e.g., the agent component) when a third-party application performs a cryptographic operation on behalf of the user, according to some embodiments.

FIG. 6 is a flowchart illustrating steps of the organization pod 139 (e.g., the agent component 132) when a third-party application 150 performs a cryptographic operation on behalf of the user 501, according to some embodiments.

The organization pod 139 receives 610, from an organization to which a user belongs, registration of a third-party application 150 to act on behalf of the user. For example, an administrator of the organization might perform the registration.

At a later point, the third-party application 150 will act on behalf of the user based on the prior registration, such as to perform a cryptographic operation (e.g., encrypting a message) on behalf of the user. As part of this, the organization pod 139 receives 620, from the third-party application (or, more specifically, from its secure service interface module 155), a request for a session in which the third-party application may act on behalf of the user. For example, referring to FIG. 5B, the secure service interface module 155 requests an application session as part of authentication step 515, and requests an application-user session as part of authentication step 530.

Accordingly, the agent component 132 authenticates 630 the third-party application for the session based at least in part on information received during the registration. As one example, referring to FIG. 5B, the organization pod authenticates the third-party application 150 in step 520 by verifying the third-party application based on its digital certificate including during the registration 505, and in step 535 by verifying that the third-party application has been registered to act on behalf of the user during the registration 505.

With the application session established, the agent component 132 receives 640, from the secure service interface module 155 of the third-party application 150, a request to perform a cryptographic operation on behalf of the user. For example, the secure service interface module 155 might request encryption of a message on behalf of the user.

The agent component 132 verifies 650 that the third-party application may perform the cryptographic operation on behalf of the user. For example, the agent component 132 may directly or indirectly consult the application-registration data 135 to determine whether the cryptographic operation, in particular, is one that the third-party application 150 has been permitted to perform on behalf of the user, as in step 565 of FIG. 5B.

Responsive to successful verification, the agent component 132 obtains 660 a cryptographic key of the user. For example, the agent component 132 may obtain a conversation key of the user, as in steps 570-575 of FIG. 5B.

The agent component 132 performs 670 the cryptographic operation (e.g., encrypting data of the third-party application, such as a financial report) on behalf of the user. In order to avoid comprising user security, this is accomplished without providing the actual cryptographic key to the third-party application 150.

Example Computer Architecture

Figure 7:
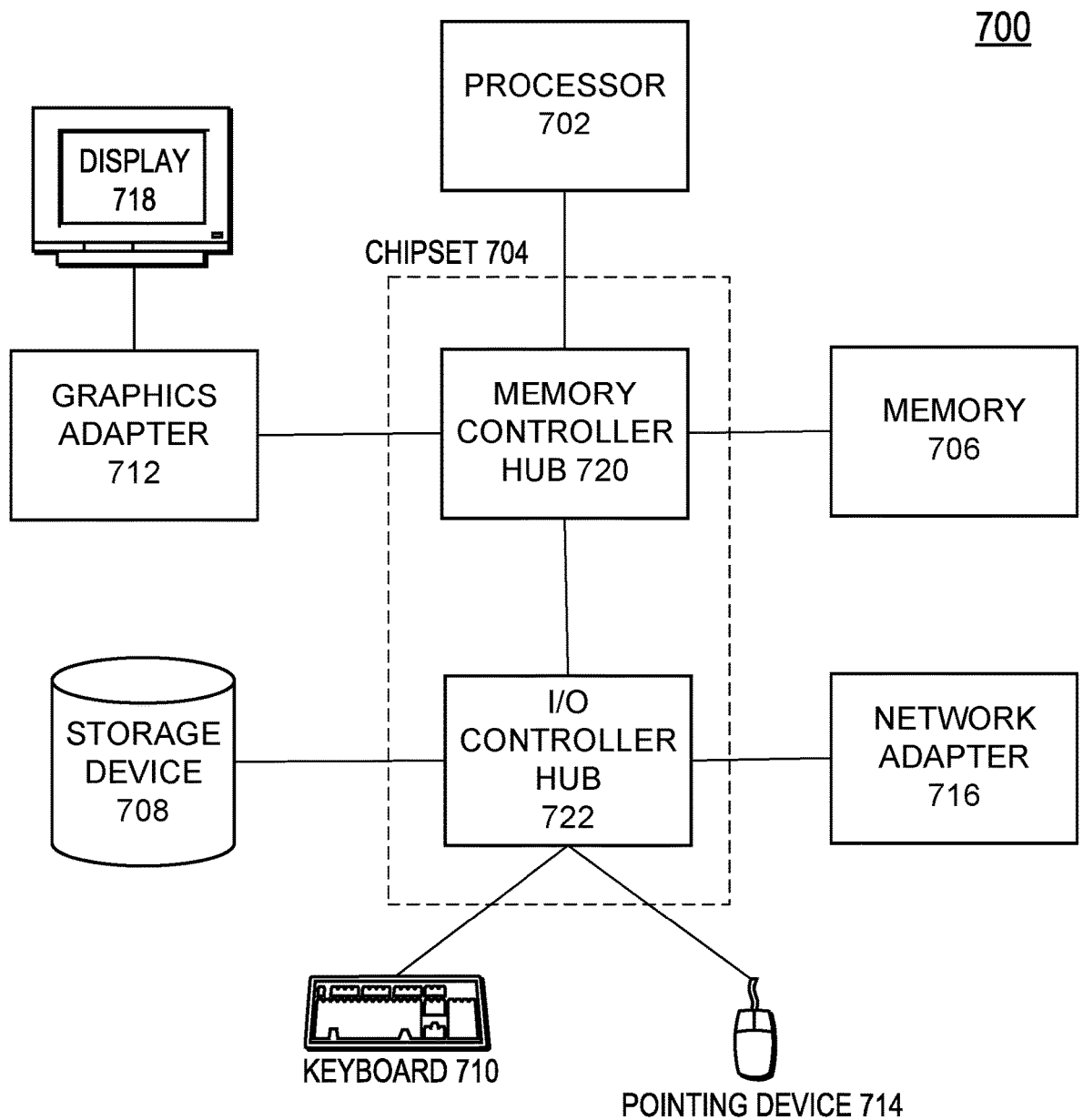
FIG. 7 is a high-level block diagram illustrating physical components of a computer used as part or all of the communication server, organization system, or client device from FIG. 1, according to one embodiment.

FIG. 7 is a high-level block diagram illustrating physical components of a computer 700 used as part or all of the server 100, system 110, or client device 120 from FIG. 1, according to one embodiment. Illustrated are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O controller hub 722. In another embodiment, the memory 706 is coupled directly to the processor 702 instead of the chipset 704.

The storage device 708 is any non-transitory computer-readable storage medium, such as a hard drive, compact disk read-only memory (CD-ROM), DVD, or a solid-state memory device. The memory 706 holds instructions and data used by the processor 702. The pointing device 714 may be a mouse, track ball, or other type of pointing device, and is used in combination with the keyboard 710 to input data into the computer 700. The graphics adapter 712 displays images and other information on the display 718. The network adapter 716 couples the computer 700 to a local or wide area network.

As is known in the art, a computer 700 can have different and/or other components than those shown in FIG. 7. In addition, the computer 700 can lack certain illustrated components. In one embodiment, a computer 700 acting as a server may lack a keyboard 710, pointing device 714, graphics adapter 712, and/or display 718. Moreover, the storage device 708 can be local and/or remote from the computer 700 (such as embodied within a storage area network (SAN)).

As is known in the art, the computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 708, loaded into the memory 706, and executed by the processor 702.

Other Considerations

Reference in the specification to "one embodiment" or to "an embodiment" or to "some embodiments" means that a particular feature, structure, or characteristic described in connection with the embodiments is included in at least one embodiment. The appearances of the phrase "in one embodiment" in various places in the specification are not necessarily all referring to the same embodiment.

It should be noted that the process steps and instructions are embodied in software, firmware or hardware, and when embodied in software, can be downloaded to reside on and be operated from different platforms used by a variety of operating systems.

The operations herein may also be performed by an apparatus. Furthermore, the computers referred to in the specification may include a single processor or may be architectures employing multiple processor designs for increased computing capability. It will be appreciated that a variety of programming languages may be used to implement the teachings of the present invention as described herein, and any references below to specific languages are provided for disclosure of enablement and best mode of the present invention.

While the invention has been particularly shown and described with reference to several embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth the in the following claims.

What is claimed is:

1. A computer-implemented method for enabling a third-party application to act on behalf of a user of an organization when using cryptographic facilities of a secure communications infrastructure, the computer-implemented method comprising:

receiving, from an administrator of the organization, registration of a third-party application to act on behalf of a user of the organization;

authenticating the third-party application for an application session using information received during the registration;

responsive to the authenticating, providing the third-party application with a session token;

receiving, from the third-party application:
a request for initiation of an application-user session during which the third-party application is permitted to act on behalf of the user, and
the session token;

authenticating the third-party application for the application-user session using the session token;

responsive to authenticating the third-party application for the application-user session, providing the third-party application with an application-user session token;

receiving, from the third-party application:
a request to provide a message comprising an encrypted form of data of the third-party application to a recipient user on behalf of the user, and
the application-user session token;

verifying, using the application-user session token, that the third-party application has been registered to provide the encrypted form of the data on behalf of the user;

responsive to the verifying, obtaining a cryptographic conversation key of the user;

without providing the cryptographic conversation key of the user to the third-party application, encrypting the data of the third-party application using the cryptographic conversation key of the user; and requesting the secure communications infrastructure to send a message comprising the encrypted data of the third-party application to the recipient user on behalf of the user.

2. The computer-implemented method of claim 1, wherein the registration comprises indications of which operations, from a set of possible operations of the secure communications infrastructure, the third-party application is permitted to perform on behalf of the user.

3. The computer-implemented method of claim 2, further comprising using the indications to verify that the third-party application has been registered to provide the encrypted form of the data on behalf of the user.

4. The computer-implemented method of claim 1, further comprising verifying a digital certificate of an agent component and providing an agent session token in response to successful verification.

5. The computer-implemented method of claim 1, wherein the information received during registration using which the third-party application is authenticated is a client digital certificate of the third-party application.

6. The computer-implemented method of claim 1, further comprising certifying that the encrypted data is from the third-party application on behalf of the user.

7. A computer-implemented method of using a secure communications infrastructure, the computer-implemented method comprising:

receiving, from an organization, registration of a third-party application to act on behalf of a user of the organization;

authenticating the third-party application for an application session using information received during the registration;

responsive to the authenticating, providing the third-party application with a session token;

receiving, from the third-party application, a request for an application-user session in which the third-party application is permitted to act on behalf of the user;

authenticating the third-party application for the application-user session using the session token;

receiving, from the third-party application, a request to perform a cryptographic operation on behalf of the user;

verifying, using an application-user session token, that the third-party application is permitted to perform the cryptographic operation on behalf of the user,
wherein the application-user session token is provided to the third-party application in response to authenticating the third-party application for the application-user session;

responsive to the verifying, obtaining a cryptographic key of the user; and without providing the cryptographic key of the user to the third-party application, performing the cryptographic operation on behalf of the user.

8. The computer-implemented method of claim 7, wherein the registration comprises indications of which operations, from a set of possible operations of the secure communications infrastructure, the third-party application is permitted to perform on behalf of the user.

9. The computer-implemented method of claim 8, wherein the verifying is performed using the indications.

10. The computer-implemented method of claim 7, further comprising:

responsive to the authenticating the third-party application for the application-user session, sending the application-user session token to the third-party application;

wherein the verifying is based on the application-user session token.

11. The computer-implemented method of claim 7, wherein the cryptographic operation encrypts data of the third-party application, the computer-implemented method further comprising requesting the secure communications infrastructure to send a message comprising the encrypted data of the third-party application to a recipient user on behalf of the user.

12. The computer-implemented method of claim 7, further comprising verifying a digital certificate of an agent component and providing an agent session token in response to successful verification.

13. The computer-implemented method of claim 7, wherein the information received during registration using which the third-party application is authenticated is a client digital certificate of the third-party application.

14. The computer-implemented method of claim 7, further comprising certifying that the encrypted data is from the third-party application on behalf of the user.

15. A non-transitory computer-readable storage medium storing instructions that when executed by a computer processor perform actions comprising:

receiving, from an organization, registration of a third-party application to act on behalf of a user of the organization;

authenticating the third-party application for an application session using information received during the registration;

responsive to the authenticating, providing the third-party application with a session token;

receiving, from the third-party application, a request for an application-user session in which the third-party application is permitted to act on behalf of the user;

authenticating the third-party application for the application-user session using the session token;

receiving, from the third-party application, a request to perform a cryptographic operation on behalf of the user;

verifying, using an application-user session token, that the third-party application is permitted to perform the cryptographic operation on behalf of the user,
wherein the application-user session token is provided to the third-party application in response to authenticating the third-party application for the application-user session;

responsive to the verifying, obtaining a cryptographic key of the user; and without providing the cryptographic key of the user to the third-party application, performing the cryptographic operation on behalf of the user.

16. The non-transitory computer-readable storage medium of claim 15, wherein the registration comprises indications of which operations, from a set of possible operations of a secure communications infrastructure, the third-party application is permitted to perform on behalf of the user.

17. The non-transitory computer-readable storage medium of claim 16, wherein the verifying is performed using the indications.

18. The non-transitory computer-readable storage medium of claim 15, the actions further comprising:

responsive to the authenticating the third-party application for the application-user session, sending the application-user session token to the third-party application;
wherein the verifying is based on the application-user session token.

19. The non-transitory computer-readable storage medium of claim 15, wherein the cryptographic operation encrypts data of the third-party application, the actions further comprising requesting a secure communications infrastructure to send a message comprising the encrypted data of the third-party application to a recipient user on behalf of the user.

20. The non-transitory computer-readable storage medium of claim 15, the actions further comprising certifying that the encrypted data is from the third-party application on behalf of the user.

\* \* \* \* \*